Aug. 4, 1925.

W. J. ANGLEMYER 1,548,300

TESTING DEVICE

Filed Dec. 24, 1921

Inventor:
Wilbur J. Anglemyer
By Curtis Camp
Attorney

Patented Aug. 4, 1925.

1,548,300

UNITED STATES PATENT OFFICE.

WILBUR J. ANGLEMYER, OF EVANSTON, ILLINOIS, ASSIGNOR TO KELLOGG SWITCH-BOARD AND SUPPLY COMPANY, OF CHICAGO, ILLINOIS, A CORPORATION OF ILLINOIS.

TESTING DEVICE.

Application filed December 24, 1921. Serial No. 524,713.

*To all whom it may concern:*

Be it known that I, WILBUR J. ANGLE-MYER, a citizen of the United States of America, and a resident of Evanston, county of Cook, and State of Illinois, have invented certain new and useful Improvements in Testing Devices, of which the following is a specification.

My invention relates to testing devices and has to do more particularly with a testing device or speed indicator mechanism for indicating when an impulse transmitting or so-called calling device as used at a substation of an automatic telephone system is properly timed or is operating at the proper speed.

It is very essential to the successful operation of an automatic telephone system that the impulse transmitter or calling device should operate at the proper speed so as not to transmit the impulses which operate the switches either too fast or too slow. In order to control its speed, the calling device is provided with an adjustable governor, so that the calling device will run at the proper speed. Heretofore, the adjuster of the calling device ordinarily has had to depend upon his own judgment to determine when it was running at proper speed. The speed of the calling device was sometimes checked against a stop watch, or the device was connected electrically with an automatic switch and the switch operated to decide whether or not the device was properly adjusted. Such methods used for adjusting calling devices were slow and not very accurate, and to overcome these objectionable features I have devised by invention.

My invention relates to a testing device by means of which the individual who is adjusting a calling device can determine accurately and quickly when the calling device is adjusted to operate at proper speed. The device may consist of a source of alternating current of constant frequency for driving a synchronous motor, whose shaft has fastened thereto a pointer rotating before an insulated metal ring, and in association therewith I provide a suitable induction coil and vibrating relay, the whole arranged so that when connected in circuit with a calling device to be tested, the apparatus will indicate when the calling device is operating at a correct speed, and will also indicate how much too slow or too fast the calling device is operating.

Figure 1:
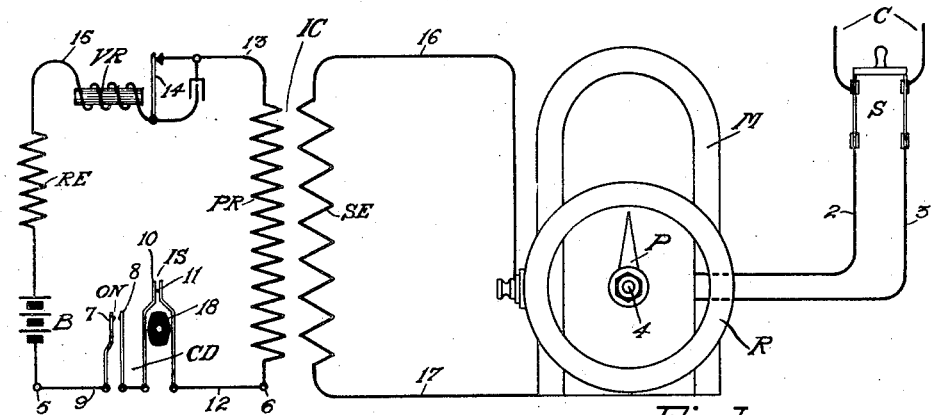
Figure 2:
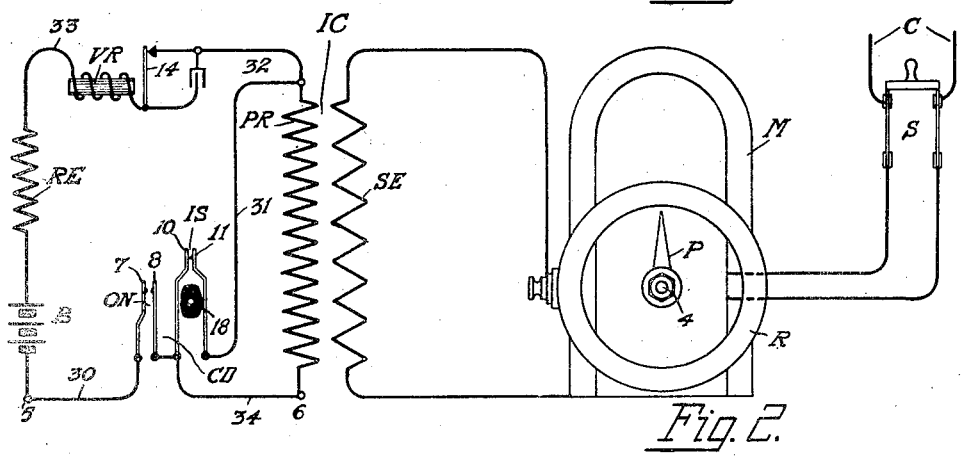
Figure 3:
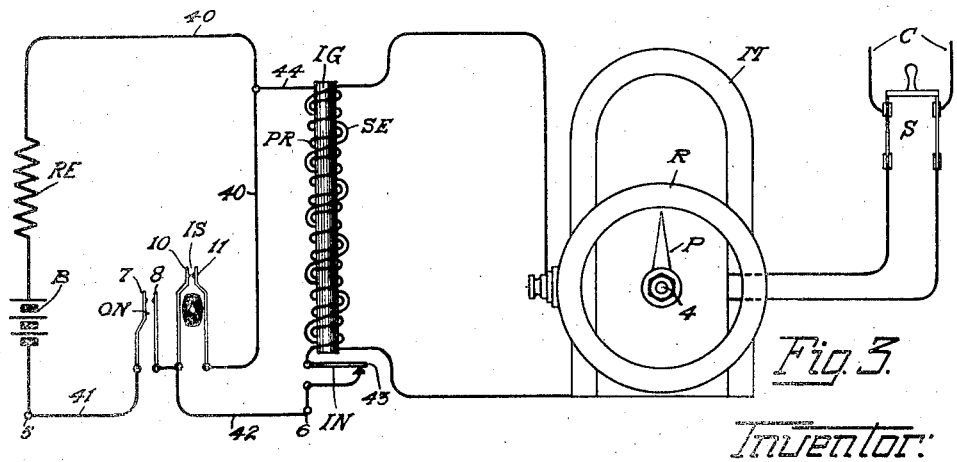

For a more complete understanding of my invention, reference may be had to the accompanying drawing, in which Fig. 1 illustrates diagrammatically the circuit arrangement of my device;

Fig. 2 illustrates diagrammatically a modified circuit arrangement of my testing device; and Fig. 3 illustrates diagrammatically another modified circuit arrangement of my testing device.

Referring now more in detail to my invention as illustrated, and especially to Fig. 1, it includes a connection to a source of alternating current, indicated at C, which may be from a suitable pole changer set to give to the alternating current a constant frequency of, say, 10 cycles per second. The calling devices of an automatic telephone exchange system are usually intended to be adjusted to transmit ten impulses per second, and I, therefore, employ a source of alternating current of a constant frequency of ten cycles a second and check the calling device against that, as will be later described. Should it be necessary to change the speed of the calling device to eleven or twelve impulses per second, the frequency of the source of alternating current would be adjusted to 11 or 12 cycles per second. A suitable switch S is provided for connecting and disconnecting the current from the conductors 2 and 3, which lead to the synchronous motor M. The motor shaft 4 of the motor M has suitably secured to its one end a pointer P in operative association with a metal ring R, suitably insulated and mounted concentrically in relation to the shaft 4 of the motor M, and in such relation with the pointer P as to place the said ring R and pointer P in parallel planes, for purposes as will presently be described. The calling device CD which is to be tested is represented diagrammatically and includes the impulse springs IS and off-normal springs ON. An induction coil IC is also provided comprising a primary winding PR, which is in circuit with a vibrating relay VR, a resistance RE and battery B. The secondary winding SE of the induction coil IC has one of its terminals connected to the ring R and its other terminal connected to the frame of the motor M.

To start the device, the switch S is closed to connect the conductors 2 and 3 with the source of alternating current, which, as stated, is of a constant frequency of 10 cycles per second. The armature of the motor M may now be rotated by some external source, and it may be manually rotated in any suitable manner, such as twirling the motor shaft between the fingers, and when the armature of the motor M is in synchronism with the current delivered over conductors 2 and 3, the motor continues running synchronously with the current. The calling device to be adjusted is now connected across the terminal points 5 and 6 and operated in the usual manner, usually for the highest number of impulses which it will call. Upon the first movement of the calling device off normal, the off-normal springs ON, which are normally open, are closed, and the closure of contacts 7 and 8 establishes an energizing circuit for the vibrating relay VR, traced from battery B to the point 5, conductor 9, closed contacts 7 and 8, the normally closed contacts 10 and 11 of the impulse springs IS, conductor 12, to the terminal 6, through the primary winding PR of the induction coil IC, conductor 13, normal contact 14 of the vibrating relay VR, through the winding of said relay VR, conductor 15, through the resistance RE to the other side of the battery B. The relay VR is energized over this circuit, and the said relay VR vibrates its armature, opening and closing contact 14, so that with the vibration of contact 14, impulses of current are inductively produced by the primary winding PR in the secondary winding SE, and as the secondary winding SE of the induction coil is connected to the metal ring R and to the frame of the motor M (and so to pointer P) over conductors 16 and 17, a band of sparks will show, passing from the synchronously rotating pointer P to the ring R. Now, when the calling device is released, the spring contacts 10 and 11 will be opened and closed ten times through the medium of the impulse cam 18, as is well understood. Now, upon the first interruption of contacts 10 and 11, the circuit of relay VR is interrupted and the band of sparks around the ring R ceases, and upon the ensuing closure of the impulse contacts 10 and 11, as the calling device rotates, a band of sparks will pass between the synchronously rotating pointer P and the metal ring R, and each succeeding opening of the contacts will interrupt the sparks and the succeeding closure of the impulse spring contacts 10 and 11 will produce a band of sparks. Now, if the openings and closings of the impulse spring contacts 10 and 11 are at the rate of ten per second, obviously the various bands of sparks will all occur in the same sector of the ring, for the reason that the pointer is rotating at the rate of ten revolutions per second and the impulse springs are opened and closed at the rate of ten per second.

Assuming now that the calling device that is being tested transmits only nine impulses per second, and that it is connected to terminals 5 and 6 and operated and then released as before described. Upon the first closure of the impulse spring contacts 10 and 11 after the device is released, a band of sparks will pass between the synchronously rotating pointer P and the metal ring R. Having assumed that the motor M is receiving current of ten-cycle frequency, and that consequently the pointer P makes ten revolutions per second, inasmuch as the calling device is now only transmitting nine impulses per second, the pointer P will make one and one-ninth revolutions for each closure and opening of the impulse spring contacts 10 and 11, and it will be apparent from the above that upon the next closure of the impulse spring contacts 10 and 11, the band of sparks which will pass between the pointer P and metal ring R will appear in another portion of the sector of the metal ring R, namely, in a sector in advance of the first, and it will thus be seen that if the dial is slower in operation than ten impulses a second, the bands of sparks will appear to rotate around the ring R in the same direction that the pointer P is traveling. If the calling dial to be tested transmits 11 impulses per second and is connected to the testing device and advanced and then released, upon the first closure of the impulse spring contacts 10 and 11, after being released a band of sparks will pass between the rotating pointer P and the metal ring R. The pointer P is making ten revolutions per second, and as the calling device is transmitting eleven impulses per second, the pointer P makes ten-elevenths of a revolution for each closure of the impulse spring contacts 10 and 11, and it will be seen from the above description that upon the next closure of the impulse spring contacts 10 and 11, the band of sparks that pass between the pointer P and ring R will appear in another sector from that in which the first band of sparks appeared, and a sector back of the first. Thus, it may be seen that if the calling dial is faster in operation than ten impulses per second, the bands of sparks will appear to move in a direction opposite to the direction of rotation of the pointer P. The adjuster of the calling device will, of course, change the governor according as the device is fast or slow and try it over again until the bands of sparks appear in the same sector of the ring R, when he will know it to be properly adjusted, and he will then lay it aside and test another one.

Referring now to Fig. 2, I there illustrate a modified circuit arrangement. When the calling device is connected to the terminals 5 and 6 for testing, and the said device is advanced, the movement off normal closes the spring contacts 7 and 8, closing an energizing circuit for the vibrating relay VR, traced from battery B over conductor 30, closed contacts 7 and 8, normally closed contacts 10 and 11, conductors 31 and 32, normal contact 14 relay VR, conductor 33, through the resistance RE to the other side of the battery B. The relay VR vibrates its contact 14, but due to the shunt 31 about the primary winding PR of the induction coil, which shunt is closed through the normally closed contacts 10 and 11, no current passes through the said winding while the calling device is being advanced, and therefore, no bands of sparks appear around the metal ring R, as was the case in Fig. 1. Now, when the calling device is released, upon the first opening of the normally closed contacts 10 and 11 of the impulse springs IS the shunt is removed from about the primary winding PR of the induction coil IC and vibratory current flows from battery B, conductor 30, closed contacts 7 and 8, conductor 34, winding PR of the induction coil IC, conductor 32 and to the other side of battery B over the previously described path. Current is induced into the secondary SE of the induction coil IC and a band of sparks will pass between the synchronously rotating pointer P and ring R. Upon each closure of the impulse spring contacts 10 and 11, the shunt will be replaced about the primary PR of the coil IC and upon each opening of the impulse spring contacts 10 and 11, the shunt will be removed. The bands of sparks appearing around the ring R will remain in the same sector or travel in the same direction as the pointer P, or in a direction opposite to the rotation of the pointer, as described in connection with Fig. 1, according to the adjustment of the device. The material difference is in Fig. 1 bands of sparks will pass between the pointer P and ring R as soon as the dial is moved off normal and when contacts 10—11 are closed, while in Fig. 2 no band of sparks will pass when the dial is first moved off normal, and they will appear only when the impulse contacts 10 and 11 are interrupted.

Referring now to Fig 3, I illustrate another modification of a circuit arrangement which may be employed in connection with the testing device of my invention. There I dispense with the vibrating relay and use an ignition coil IG of suitable make, which is provided with an interrupter IN for interrupting the primary circuit. When the calling device CD is connected in circuit at terminals 5 and 6 and advanced and then released, as before described, upon the first movement off normal of the calling device CD, contacts 7 and 8 of off-normal contacts ON are closed, but nothing more happens at this time due to the shunt about the primary winding PR of the coil IG. Upon the first interruption of impulse contacts 10 and 11, the shunt is removed from the primary winding PR of the coil IG and current flows through winding PR from battery, conductor 41, closed off-normal contacts 7 and 8, conductor 42, closed interrupter contact 43 of the coil IG, through the primary winding PR of the coil IG, conductors 44 and 40 through the resistance RE to battery. The primary winding PR receiving current electromagnetically brings about the interruption of contact 43 and interrupted current is induced into the secondary SE of the coil IG, and the appearance of the bands of sparks on the ring R will be the same as described in connection with Figs. 1 and 2.

From the foregoing description, it may be seen that the bands of sparks around the metal ring gives a very sensitive means for indicating when the dial is running at the proper speed, and while I have illustrated and described my invention operating in connection with the testing of a specific piece of apparatus, it will be readily understood that my invention is not limited to such use, but may be used in various ways when it is desired to obtain an indication of the speed of an operating device. Moreover, modifications will readily be apparent to those desiring to employ the invention, and therefore applicant does not wish to limit his invention to the exact structure shown and described. In the appended claims I intend to cover the invention broadly, the present disclosures indicating only an embodiment I prefer for the immediate purpose of testing a particular item.

What I claim as new and desire to secure by United States Letters Patent, is:

1. In a testing device for calling devices, a source of current of a predetermined frequency and a synchronous motor operated thereby, a pointer secured to the shaft of said motor, a metal ring adjacent said pointer, an induction coil, a vibrating relay connected in circuit with the primary of said induction coil, a circuit for said vibrating relay, and springs controlled by said calling device for closing said circuit when said calling device is being tested whereby current impulses are caused to flow through the primary of said induction coil, the said impulses being induced into the secondary of said induction coil which is connected to said metal ring.

2. In a testing device for calling devices, a constant speed motor, a pointer secured to the shaft of said motor, a metal ring mounted adjacent to said pointer, an induction coil having a primary winding, a relay connected in circuit with said primary winding, an operating circuit for said relay, springs for said calling device for closing said circuit when the calling device to be tested is operated whereby said relay energizes and de-energizes to cause impulses of current to flow through said primary winding, and circuit connections between the secondary of said induction coil and the metal ring.

3. In a testing device for calling devices, a constant speed motor, a pointer secured to the shaft of said motor and a metal ring adjacent to said pointer secured to said shaft, an induction coil having a primary and a secondary winding, a vibrating relay connected in circuit with the primary of said coil and the calling device to be tested, a circuit for said relay closed when the calling device to be tested operates to cause interrupted current to flow through the primary of said induction coil, and circuit connections for the secondary of said coil and said metal ring.

4. A testing device for calling devices, a constant speed motor device, a pointer on the shaft of said motor device, a metal ring, an induction coil, a vibrating armature and battery conected in circuit with the primary induction coil winding, a calling device to be tested and a circuit controlled by said calling device and adapted to be closed for said armature when the calling device is moving to cause an interrupted current to flow through the primary induction coil winding, and a plurality of bands of sparks passing between the said rotating pointer and said metal ring upon the movement of said calling device to visually indicate the operative condition of said calling device, 5. A testing device for calling devices comprising a source of current of a predetermined frequency and a synchronous motor operated thereby, an induction coil, a circuit for the calling device to be tested including a battery, a vibrating relay and the primary of said induction coil, a rotating pointer secured to the shaft of said motor and a metal ring supported near said pointer and concentrically with said shaft, signals displayed between said pointer and said ring when the calling device is moving for indicating the speed of said device as related to the motor.

6. A testing device of the character described including a constant speed motor driving a rotary element having located adjacent to it an arcuate conducting element, a rhythmic impulse transmitter to be tested, and electrical connections including an induction coil between said transmitter and said element adapted to visually indicate the rhythm of the impulses by means of said rotary element.

7. A device for testing a rhythmic impulse transmitter including a movable member and a stationary member, means including an induction coil for translating the impulses of the impulse transmitter into electrical visual signals and measuring the extent of travel of said movable member between signals, the speed of movable member determining the points at which the signals are shown.

8. A testing apparatus for rhythmically transmitted electrical impulses, said apparatus including a rotary element having a fixed speed, a pointer for said rotary element, an arcuate member adjacent to said pointer, an induction coil through the windings of which said electrical impulses flow, said electrical impulses serving to transmit sparks between said pointer and said arcuate member, said arcuate member adapted for measuring the angular displacement of said member between sparks.

9. A testing apparatus comprising a stationary and a rotatable member for timing intervals between transmitted current impulses, said rotatable member causing the impulses to manifest visual electrical signals upon said stationary member, the excursion of said rotatable member between signals indicating elapsed time betwen signals.

10. An apparatus including a traveling element moving at a known speed, a rhythmic device, and means including an induction coil for electrically translating the rhythmic impulses of said device into correspondingly timed visual indications manifested on said apparatus in its travel, the extent of travel between signals indicating the time of the rhythm.

11. An apparatus including a rotary element traveling at a known speed, and devices including an induction coil for transmitting electrical impulses to said element and visually manifesting them thereon, the angle traversed by said element between impulses indicating the time elapsed between them.

Signed by me at Chicago, in the county of Cook and State of Illinois, this 21st day of December, 1921.

WILBUR J. ANGLEMYER.